June 14, 1938.  E. R. WOLFERT  2,120,825
LIQUID LEVEL ALARM
Filed April 6, 1935  2 Sheets-Sheet 1
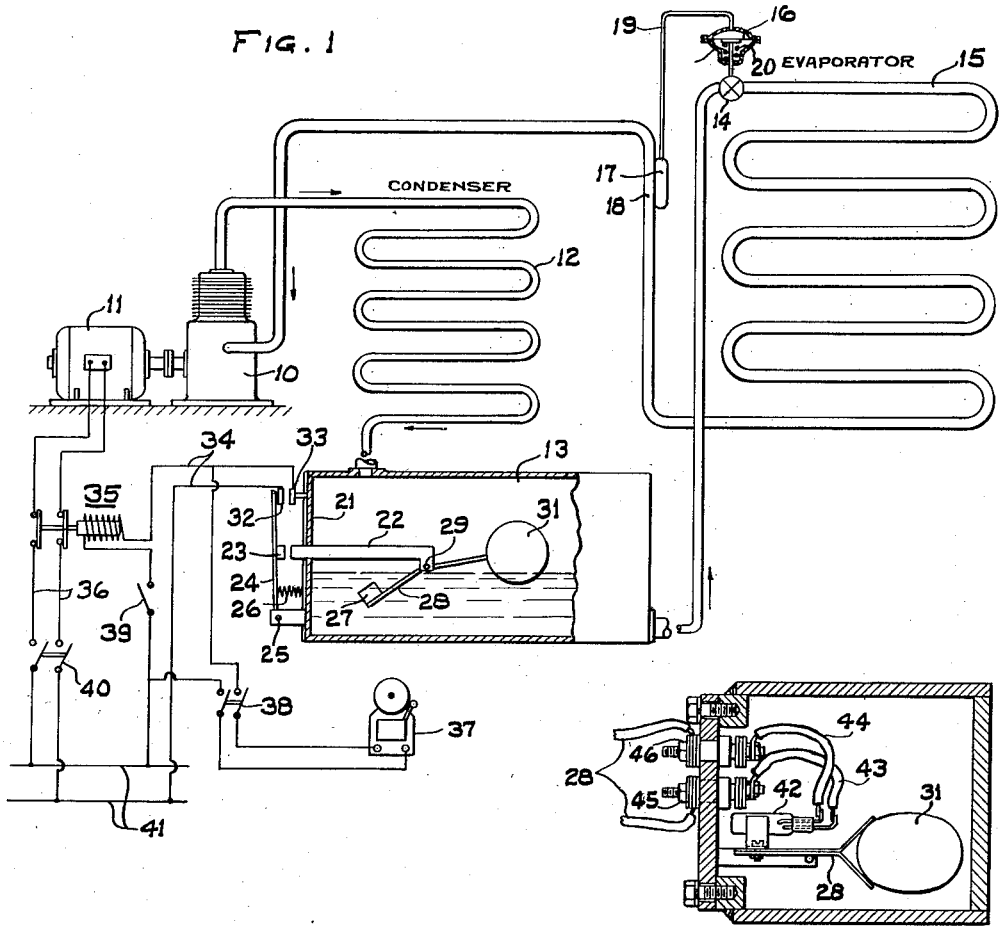
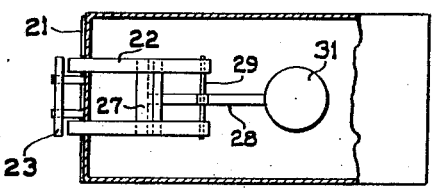
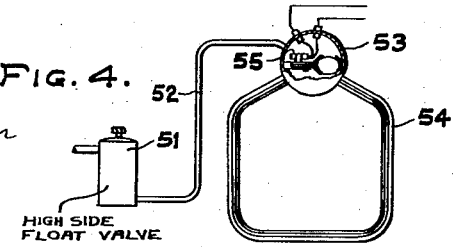
WITNESSES:
R. J. Eisinger
C. H. Lutz
INVENTOR
EDWARD R. WOLFERT.
BY
ATTORNEY

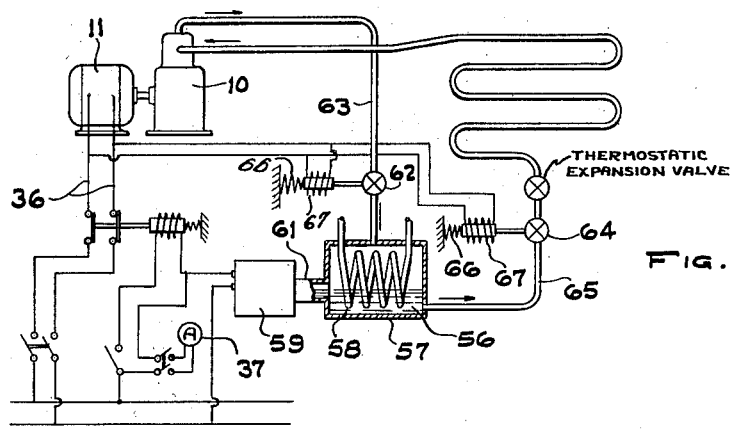
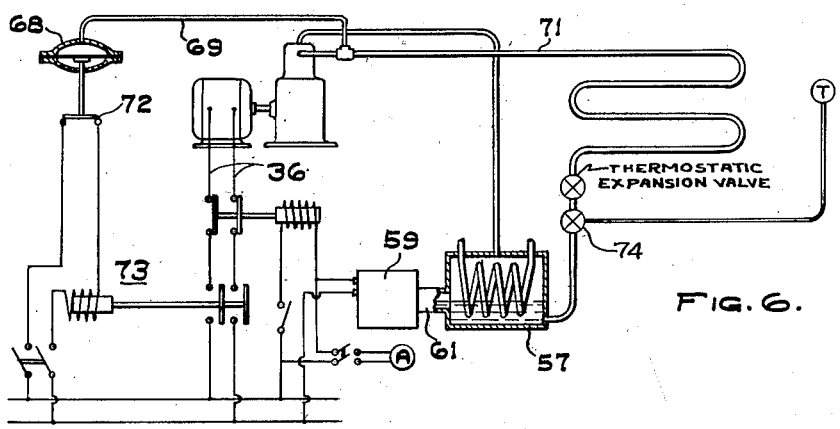
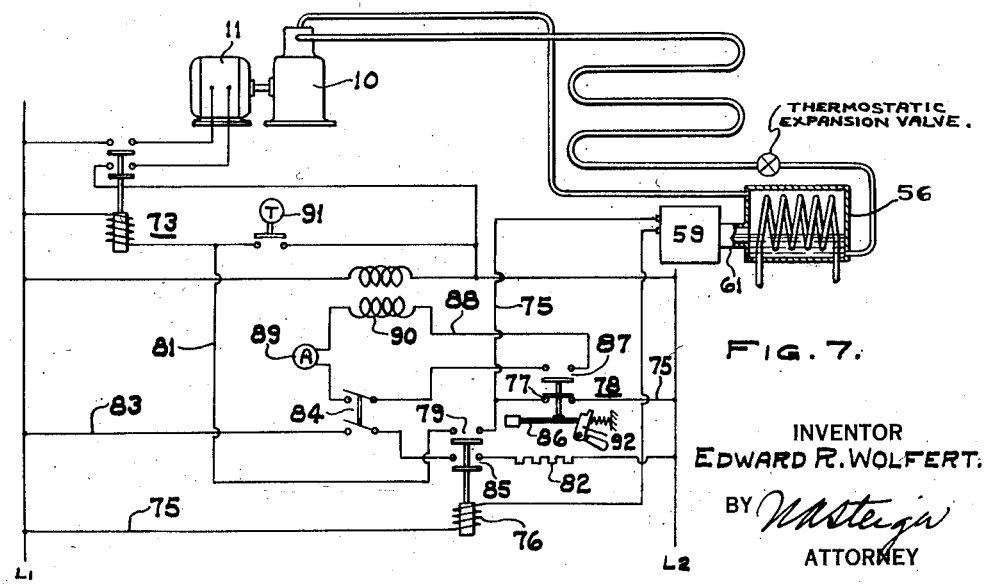

Patented June 14, 1938

2,120,825

UNITED STATES PATENT OFFICE 2,120,825

LIQUID LEVEL ALARM

Edward R. Wolfert, Wilkinsburg, Pa., assignor to Westinghouse Electric & Manufacturing Company, East Pittsburgh, Pa., a corporation of Pennsylvania Application April 6, 1935, Serial No. 15,008

13 Claims. (Cl. 62—3)

My invention relates to refrigerating apparatus, more particularly to apparatus for indicating leakage of refrigerant from the system, and it has for an object to provide improved apparatus.

In refrigerating apparatus having a liquid receiver and a thermostatic expansion valve or similar expansion device, a leakage indicating mechanism may be provided to give an alarm or other indication in response to drop in liquid level in the liquid receiver below a normal or predetermined level. When the refrigerating system is shut down, refrigerant may flow from the liquid receiver into another part of the system, for example, it may be absorbed by the oil in the compressor crank case. In such case, the consequent drop in liquid level is not a true indication of leakage of refrigerant from the system.

It is an object of my invention to avoid actuation of the leakage indicating mechanism when the drop in liquid level is due to flow of refrigerant into another part of the system rather than to leakage from the system.

In accordance with my invention, I provide means for initiating operation of the condensing unit in response to drop in liquid level, for the purpose of restoring the liquid level if the drop has been due to flow of refrigerant into another part of the system. The leakage indicating mechanism is arranged to function if the normal or predetermined level of liquid is not restored within a predetermined period of time thereafter.

The above and other objects are effected by my invention as will be apparent from the following description and claims taken in accordance with the accompanying drawings forming a part of this application, in which:

Fig. 1 is a diagrammatic view of a refrigerating system embodying one form of my invention;

Fig. 2 is a plan view of the liquid level responsive mechanism;

Fig. 3 is an elevation of a modified form of liquid level responsive mechanism;

Fig. 4 is a diagrammatic view of a modified portion of the refrigerating system; and, Figs. 5, 6, and 7 show diagrammatically three embodiments of the invention in which provision is made for the variations in liquid level due to operating conditions and not to leakage.

Referring to the drawings in detail, I show a refrigerating system of known construction including a compressor 10 operated by a motor 11, a condenser 12, a liquid receiver or reservoir 13, a thermostatic expansion valve 14, and an evaporator 15, said elements of the system being connected for flow of refrigerant therethrough in the order named and from the evaporator to the compressor. The thermostatic expansion valve 14 is of conventional construction, including a diaphragm 16 subjected on its lower side to the pressure in the evaporator 15 and to the force of a compression spring 20. It further includes a thermostatic bulb 17, which develops a pressure varying as a function of the temperature of the discharged vapor in the suction conduit 18. This pressure is conveyed through a tube 19 and imposed on the upper side of the diaphragm 16 in valve closing direction. The valve 14 thus operates to admit such quantity of liquid to the evaporator as can be fully vaporized therein and superheated to a predetermined degree, as is well known in the art.

If refrigerant should leak out of the system at any time, the quantity of liquid contained in the reservoir 13 is reduced, while the thermostatic expansion valve 14 continues to withdraw liquid refrigerant therefrom to supply the evaporator 15. In accordance with my invention, I provide a mechanism which responds to the liquid level in the reservoir 13, whereby leakage from the refrigerating system can be determined.

The liquid level responsive mechanism of Fig. 1 is of novel construction and includes a magnetic circuit extending through an end wall 21 of the liquid receiver, which end wall is made of a non-magnetic material, such as brass. The magnetic circuit comprises two members 22 of soft iron or other material which may be magnetized but which does not retain the magnetism when the source of magnetism is removed. These non-retentive magnetizable members 22 extend through openings in the brass wall 21, said openings being preferably closed and sealed by silver solder. An armature 23 carried on a lever 24 pivoted at 25, bridges the outer ends of the members 22 and is adapted to be drawn toward said members when magnetized, against the bias of a spring 26. A permanent magnet 27 is disposed within the liquid receiver for magnetizing the magnetic circuit.

The permanent magnet 27 is carried on a lever 28, which is pivoted on a non-magnetic pin 29, preferably carried by the members 22. A float member 31 is attached to the lever 28 and so arranged that as the liquid level drops, the magnet 27 is moved toward the members 22.

The lever 24 actuated by the armature 23 is adapted to move an electrical contact 32 into engagement with a stationary contact 33. The contacts 32 and 33 are connected in an electrical circuit 34, which may be used either to operate a warning device or to shut down the refrigerating system by deenergizing the motor 11, or both. The solenoid of a relay 35 is connected in the circuit 34, the contacts of the relay being connected in the circuit 36 for the motor 11. Also, a warning device, such as a bell 37, is connected in the circuit in parallel with the relay 35. Switches 38 and 39 are provided for the bell 37 and the relay 35, respectively, so that either or both of such devices may be rendered operative or inoperative at will. The circuit 36 is provided with any suitable control mechanism known in the art, a simple two-pole switch 40 being illustrated by way of example. The circuits 34 and 36 are connected to a line 41, from which electrical energy is supplied.

The refrigerating system operates in the usual well known manner of such apparatus. The compressor 10 compresses refrigerant, which is then conveyed to the condenser 12 and condensed therein. The condensed refrigerant collects in the liquid receiver 13, from which liquid refrigerant is supplied to the evaporator 15, the pressure thereof being reduced by the thermostatic expansion valve 14. The liquid refrigerant is evaporated in the evaporator and the vaporized refrigerant is returned to the compressor again to be compressed. As refrigerant leaks out of the system, the supply of liquid refrigerant in the liquid receiver 13 is drawn upon, causing the liquid level to be lowered.

The operation of the liquid level responsive mechanism is as follows: As the liquid level in the receiver 13 drops, the float member 31 moves the permanent magnet 27, through the lever 28, toward the members 22, and as the liquid level rises, the float member moves the permanent magnet away from the members 22. As the liquid level reaches such a low point as to indicate that refrigerant is leaking from the system, the permanent magnet 27 is moved so close to the members 22 as to magnetize the magnet circuit comprising the members 22, the armature 23 and the permanent magnet 27. The armature 23 is thus attracted and drawn toward the members 22, thereby closing the contacts 32 and 33 to energize the circuit 34. Thereupon, if the switch 38 is closed, the bell 37 rings to sound a warning indicating loss of refrigerant. If the switch 39 is closed, the relay 35 is energized and opens the circuit 36 to the motor 11, thereby shutting down the refrigerating system.

When the supply of liquid refrigerant is replenished, the float member 31 rises in response to a higher or normal liquid level and moves the permanent magnet 27 away from the member 22. The magnetic circuit is thereupon deenergized and the spring 26 moves the lever 24 to open the contacts 32 and 33. The circuit 34 is thereupon opened.

The provision of a permanent magnet as the movable member for controlling the magnetization of the magnet circuit provides a definite pull-in point, that is, the point at which the contacts close is very definite; therefore, the device is quite accurate in operation. Also, the provision of a permanent magnet avoids the necessity of a regulated source of voltage and a constant source of energy.

In Fig. 3, I show a modified form of liquid level responsive mechanism in which a mercury switch 42 mounted on the lever 28' to which the float member 31 is attached. The switch 42 comprises a glass bulb containing a small quantity of mercury and two contacts arranged in such position that, as the glass bulb is tilted by downward movement of the float member 31, the mercury closes the circuit between the two contacts, while, if it is tilted in the opposite direction, the circuit is opened. The contacts are connected by flexible leads 43 and 44, and by studs 45 and 46 extending through the wall of the reservoir to the circuit 34 of Fig. 1, said contacts thereby effecting the same function as the contacts 32 and 33 of Fig. 1.

In the operation of this mechanism, as the liquid level drops to a predetermined point, the float member 31 tilts the switch 42 in clockwise direction to close the circuit 28 through the contacts of the switch 42. As the quantity of liquid refrigerant is replenished to raise the liquid level, the float member 31 tilts the switch 42 in counterclockwise direction to open the circuit.

In the refrigerating apparatus of Fig. 4, a high side float valve 51 controls the flow of liquid refrigerant from the high side to the low side and reduces the pressure thereof. It is connected through a conduit 52 to the header 53 of a flooded evaporator 54. In this case, the float valve admits all the condensed refrigerant conveyed to it, except a small substantially constant quantity required for operation of the float therein, so that the variation in quantity of refrigerant in the system is effected in the header 53. Accordingly, in this case, I provide a liquid level responsive mechanism 55, such as that shown in Fig. 3, within the header 53 so as to respond to the liquid level therein. The operation of this embodiment is the same as that of the embodiment shown in Fig. 3.

I have found that, when refrigerating apparatus using a refrigerant soluble in oil is not operated for long periods, some of the refrigerant passes from the liquid receiver or other part of the high side, usually due to absorption of refrigerant vapor by the oil in the crank case. In such case, a drop in liquid level will give a false indication since there has been no actual loss of refrigerant from the system. To overcome this difficulty, one of the schemes shown in Figs. 5 to 7 may be used.

In the apparatus of Fig. 5, I use a water-cooled condenser 56 comprising a chamber 57 in which a water cooling coil 58 is disposed. The bottom of the chamber 57 serves as the liquid receiver. The liquid level responsive mechanism is contained in a chamber 59 which is connected to the chamber 57 by a pipe 61 of large diameter so positioned that the liquid level is always between the top and bottom of the interior of the pipe whereby the liquid level in the chambers 57 and 59 is always the same. In this embodiment, I provide a valve 62 in the conduit 63 connecting the discharge of the compressor 10 to the condenser, and a valve 64 in the conduit 65 connecting the condenser to the evaporator. The valves 62 and 64 are biased to closed position by springs 66 and are actuated in open direction by solenoids 67. The latter are connected to the circuit 36 in parallel with the compressor motor 11.

In the operation of this embodiment, the solenoids 67 are energized by the circuit 36 simultaneously with the compressor motor 11 to permit flow of refrigerant through the conduits 67 and 65 for operation of the refrigerating apparatus. When the circuit 36 is opened to discontinue refrigerating operation, the solenoids are de-energized and the springs 66 close the valves 62 and 64. Escape of refrigerant from the chamber 57 and consequent drop in liquid level is thus prevented. The liquid level responsive mechanism thus responds only to a decrease to liquid level indicating leakage of refrigerant from the apparatus and may either effect an alarm or open the circuit 36, or preferably do both, as previously described.

Referring to Fig. 6, leakage of refrigerant to the low side of the system causes an increase in pressure therein, so that if the compressor is operated in response to such increased pressure, the escaped refrigerant will be returned to the chamber 57 before sufficient refrigerant has leaked out to give a false alarm. A pressure-responsive device 68 is connected by a conduit 69 to the suction conduit 71 connecting the outlet of the evaporator with the inlet of the compressor, and operates a switch 72 controlling a relay 73 that is adapted to open the compressor motor circuit 36. A thermostat T, responsive to the cooling load, actuates a valve 74 controlling supply of liquid refrigerant to the evaporator. In the operation of the apparatus of Fig 6, the device 68 operates in response to a predetermined maximum pressure in the low side, such as 65 to 70 lbs. per sq. in. when using Freon, to close the switch 72 thereby actuating relay 73 to close the compressor motor circuit 36.

The compressor operates until the pressure in the low side is reduced to a predetermined minimum such as 25 lbs. per sq. in. When the thermostat admits liquid refrigerant to the evaporator to supply the cooling load, the evaporation of refrigerant in the evaporator raises the pressure so that operation of the apparatus is effected as just described. If the thermostat does not operate to open the valve 74 for a long period of time, leakage of refrigerant raises the pressure in the low side, so that the compressor is operated as described to return the refrigerant to the chamber 57. Thus, the liquid level responsive mechanism in the chamber 57 operates in the same manner as in the previous embodiments, and only to indicate leakage of refrigerant.

A particular advantage of the valve 74 in this arrangement is that it permits operation of the compressor to return escaped refrigerant to the chamber 57 without effecting refrigeration in the evaporator when such refrigeration is not desired. Suppose, for example, that sufficient refrigerant has escaped into the low pressure side to cause the pressure responsive device 68 to effect operation of the compressor but that the cooling load is light and refrigeration is not desired. The valve 74 cuts off the flow of liquid refrigerant to the evaporator while the compressor is operating, whereby such undesired refrigeration is avoided.

In Fig. 7, I show the preferred embodiment of my invention. When the liquid level drops to a predetermined low point, the compressor is first operated to return to the condenser or liquid reservoir refrigerant that has escaped to the low side before sounding an alarm. The apparatus includes a water cooled condenser 56 connected by a pipe 61 to a chamber 59, as in Figs. 5 and 6. The chamber 59 preferably contains a float switch 42 as shown in Fig. 3.

The switch in the chamber 59 is connected in a circuit 75; the latter extending from line conductor L1 through the winding of a relay 76, the switch in the chamber 59, and the normally closed contacts 77 of a time delay device 78, to the line conductor L2. The relay 76 has one set of contacts 79 for controlling the relay 73 through a circuit 81 extending from the line conductor L1, through the winding of the relay 73, the contacts 79, and then joining the circuit 75 to continue through the contacts 77 to the line conductor L2. The time delay device 78 comprises an electrical resistance heating element 82 connected in a circuit 83 extending from the line conductor L1, through one pole of a manually actuated switch 84, contacts 85 of the relay 76, and the heating element 82 to the line conductor L2. The time delay device 78 further includes a temperature responsive element 86, which is subjected to the heat generated by the heating element 82, and which is adapted to open the contacts 77 and to close another set of contacts 87, when the heating element has been energized for a predetermined period of time. The contacts 87 are adapted to close an alarm circuit 88 for energizing an alarm device 89. The circuit 88 also extends through a second pole of the manually actuated switch 84, and it is energized by a transformer 90, the primary winding of which is connected across the line conductors L1 and L2.

The operation of the embodiment shown in Fig. 7 is as follows: As the liquid level in the condenser 56 drops to a predetermined point, the switch in the chamber 59 closes the circuit 75, whereupon the energized relay 76 closes its contacts 79 and 85. The contacts 79 complete the motor circuit 81, so that the relay 73 starts the motor and compressor. Any refrigerant which may have escaped to the low side of the system, is returned to the condenser. The contacts 85 close the circuit 83 to energize the heating element 82. If the normal liquid level is restored, by return of refrigerant to the condenser, before the heating element 82 has been heated to a temperature causing the thermostatic element 86 to operate, the switch in the chamber 59 reopens the circuit 75 to deenergize the relay 76. Further operation of the motor and compressor, so far as it may be effected by the liquid level responsive mechanism, is terminated. It may, however, be continued by the thermostat 91 which normally controls the operation. The contacts 85 discontinue further heating of the element 82. Thus, when the drop in liquid level is due to escape of refrigerant to the low side, the refrigerant is returned to the condenser and sounding of the alarm is avoided.

If the normal liquid level is not restored within a predetermined period of time, the heating element 82 reaches a temperature causing the temperature responsive element 86 to open the contacts 77 and close the contacts 87, the element 86 being latched in such position by a latching mechanism 92. The opening of the contacts 77 opens the circuits 75 and 81, so that further operation of the compressor and motor under control of the liquid level responsive mechanism is terminated. The closing of the contacts 87 completes the circuit 88, causing the device 89 to sound an alarm, indicating that liquid refrigerant has escaped from the system. Upon hearing the alarm, the operator may open the switch 84 to discontinue further sounding of the alarm. The refrigerating capacity of the mechanism remains available, however, under control of the normal thermostat 91.

When the trouble has been corrected and the normal liquid level restored, the time delay device 78 is unlatched and the manual switch 84 reclosed to render the mechanism again operable for sounding an alarm.

From the above description, it will be seen that I have provided apparatus which will sound an alarm or give a signal when a predetermined quantity of refrigerant, for example, 10 pounds, has escaped from the system.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a refrigerating system, the combination of a compressor, a motor for driving the compressor, a condenser, a liquid receiver, an evaporator, a magnetic circuit extending through a wall portion of the liquid receiver and including an armature located exteriorly of the liquid receiver and a magnet located interiorly thereof, a warning signal or alarm, a circuit for said warning signal or alarm controlled by said armature, and means responsive to a predetermined low liquid level in the liquid receiver for actuating said magnet so as to magnetize said magnetic circuit and operate said armature to effect operation of said warning signal or alarm.

2. In a refrigerating system the combination of a compressor, a motor for driving the compressor, a condenser, a liquid receiver, an evaporator, a magnetic circuit extending through a wall portion of the liquid receiver and including an armature located exteriorly of the liquid receiver, a float member within the liquid receiver and operable to close and open said magnetic circuit upon variation in liquid level within the liquid receiver, and means responsive to operation of said armature for deenergizing said motor, said parts being so arranged that said motor is deenergized when a predetermined low liquid level in the liquid receiver is reached.

3. The combination with a refrigerating system including means for liquefying vaporized refrigerant and circulating refrigerant through the system and including a reservoir for liquid refrigerant in which the liquid level is affected by the quantity of refrigerant in the system, of a device to be operated when the quantity of refrigerant in the system has decreased to a value indicating leakage of refrigerant from the system, a time-delay device, means responsive to a predetermined low liquid level in said reservoir for effecting operation of said liquefying and circulating means and of said time delay device and responsive to a higher or normal liquid level for terminating its action in effecting operation of said liquefying and circulating means and for terminating operation of said time relay device, and means controlled by the time-delay device when operated for a predetermined period of time for effecting operation of said first-mentioned device.

4. The combination with a refrigerating system including means for liquefying vaporized refrigerant and circulating refrigerant through the system and including a reservoir for liquid refrigerant in which the liquid level is affected by the quantity of refrigerant in the system, of an indicating device to be operated when the quantity of refrigerant in the system has decreased to a value indicating leakage of refrigerant from the system, means responsive to decrease in liquid level in said reservoir below a normal level for effecting operation of said circulating means and for operating said indicating device if the normal liquid level is not restored within a predetermined period of time.

5. The combination with a refrigerating system including a compressor and a reservoir for liquid refrigerant in which the liquid level is affected by the quantity of refrigerant in the system, of a warning device to be operated when the quantity of refrigerant in the system has decreased to a value indicating leakage of refrigerant from the system, a time delay device, means for automatically controlling the operation of the compressor in accordance with the refrigerating demand, means responsive to a predetermined low liquid level in said reservoir for effecting operation of said compressor independently of the action of said first mentioned means and operation of said time delay device and responsive to a higher or normal liquid level for terminating its action in effecting operation of said compressor and for terminating operation of said time delay device, and means controlled by the time delay device when operated for a predetermined period of time for effecting operation of said warning device.

6. In a refrigerating system of the type having a predetermined minimum quantity of refrigerant therein in normal operation, a portion of which is liquid and a portion of which is vapor, the combination of means for condensing vaporous refrigerant, a container for liquid refrigerant, means responsive to a deficiency in the quantity of liquid refrigerant in the container for initiating operation of the condensing means and for continuing operation thereof within a predetermined period of time thereafter as long as the deficiency exists, a leakage indicating device, and means for effecting operation of the leakage indicating device in response to a deficiency of liquid refrigerant in said container at the end of said predetermined period of time.

7. The combination with a refrigerating system including a compressor and a reservoir for liquid refrigerant in which the liquid level is affected by the quantity of refrigerant in the system, of means dependent upon both operation of the compressor for a predetermined period of time and a predetermined low liquid level at the end of said predetermined period of time, to give a warning.

8. The combination with a refrigerating system including a compressor and a reservoir for liquid refrigerant in which the liquid level is affected by the quantity of refrigerant in the system, of means responsive to a predetermined low liquid level in the reservoir for effecting operation of the compressor, and means dependent upon both operation of the compressor for a predetermined period of time and a predetermined low liquid level at the end of said predetermined period of time, to give a warning.

9. The method of controlling the operation of a warning device for indicating leakage of refrigerant from a refrigerating system including a compressor and a reservoir for liquid refrigerant, which method comprises effecting operation of said warning device in response to a predetermined low liquid level after operation of the compressor for a predetermined period of time.

10. The method of controlling the operation of a warning device for indicating leakage of refrigerant from a refrigerating system including a compressor and a reservoir for liquid refrigerant, which method comprises operating the compressor in response to a predetermined low liquid level in said reservoir and effecting operation of said warning device in response to continuance of a predetermined low liquid level for a predetermined period of time.

11. The combination with a refrigerating system including an evaporator, a compressor and a condenser, said refrigerating system including a reservoir for liquid refrigerant in which the liquid level is effected by the quantity of refrigerant in the system, a warning device, means responsive to a predetermined low liquid level in said reservoir for effecting operation of said warning device, and means for preventing operation of said warning device in response to a low liquid level if the drop in said liquid level is due to a cause other than leakage of refrigerant from the system.

12. The combination with a refrigerating system including an evaporator, a compressor having a crankcase connected in the low pressure side of the system and adapted to contain oil for lubrication of the compressor, and a condenser, said refrigerating system including a reservoir for liquid refrigerant connected in the high pressure side of the system and in which the liquid level is affected by the quantity of refrigerant in the system, of a valve for controlling the flow of liquid refrigerant from said high pressure side to said evaporator, a thermostat responsive to the cooling load of the apparatus for controlling said valve, means for effecting operation of said compressor in response to an operating condition of the refrigerating system that may be caused by leakage of refrigerant from the high pressure side to the low side of the system, whereby excessive refrigerant absorbed by the oil in the crankcase of the compressor is withdrawn therefrom and returned to the reservoir to restore the liquid level therein, a warning device, and means responsive to a predetermined low liquid level in said reservoir for effecting operation of said warning device.

13. The combination with a refrigerating system including an evaporator, a compressor having a crankcase connected in the low pressure side of the system and adapted to contain oil for lubrication of the compressor, and a condenser, said refrigerating system including a reservoir for liquid refrigerant connected in the high pressure side of the system and in which the liquid level is affected by the quantity of refrigerant in the system, of a valve for controlling the flow of liquid refrigerant from said high pressure side to said evaporator, a thermostat responsive to the cooling load of the apparatus for controlling said valve, means for effecting operation of said compressor in response to a predetermined maximum pressure of the refrigerant in the low pressure side of the system, whereby excessive refrigerant absorbed by the oil in the crankcase of the compressor is withdrawn therefrom and returned to the reservoir to restore the liquid level therein, a warning device, and means responsive to a predetermined low liquid level in said reservoir for effecting operation of said warning device.

EDWARD R. WOLFERT.